United States Patent [19]

Pearl et al.

[11] 3,864,997

[45] Feb. 11, 1975

[54] SYSTEM AND METHOD FOR CUTTING PATTERN PIECES FROM SHEET MATERIAL

[75] Inventors: David R. Pearl, West Hartford; Samuel Clifford Robison, Manchester, both of Conn.

[73] Assignee: Gerber Garment Technology, Inc., East Hartford, Conn.

[22] Filed: Feb. 6, 1974

[21] Appl. No.: 439,999

Related U.S. Application Data

[62] Division of Ser. No. 314,144, Dec. 11, 1972, Pat. No. 3,803,960.

[52] U.S. Cl............................. 83/49, 83/56, 83/528, 83/747, 83/756, 83/925 CC
[51] Int. Cl............................ D06h 7/00, B26d 1/10
[58] Field of Search....... 83/925 CC, 747, 756, 758, 83/528, 49, 56

[56] References Cited
UNITED STATES PATENTS

| | | | |
|---|---|---|---|
| 1,172,058 | 2/1916 | Scheyer | 83/925 CC |
| 3,245,295 | 4/1966 | Mueller | 83/56 |
| 3,573,859 | 4/1971 | Sederberg | 83/925 CC |
| 3,715,945 | 2/1973 | Mochizuki et al. | 83/528 X |
| 3,761,675 | 9/1973 | Mason | 83/925 CC X |

*Primary Examiner*—J. M. Meister
*Attorney, Agent, or Firm*—McCormick, Paulding & Huber

[57] ABSTRACT

A system and method for cutting multiple pattern pieces from a layup of sheet material employing two-stage digitizing to produce a cutting program in which contour segments of individual pieces are cut by a cutting blade in different directions about the pattern pieces. The direction in which a particular segment of a pattern piece contour is cut and the order in which the segments are cut are selected to most easily facilitate the cutting operation. The point on any given pattern piece toward which a cutting blade is advanced from different directions is generally the point of closest approach to an adjacent or contiguous pattern piece in the marker cut in the sheet material. The feed rate and tangency of the cutting blade are also regulated at sensitive cutting points such as the points of closest approach to an adjacent pattern piece.

5 Claims, 8 Drawing Figures

SYSTEM AND METHOD FOR CUTTING PATTERN PIECES FROM SHEET MATERIAL

This is a division of application Ser. No. 314,144, filed Dec. 11, 1972, now U.S. Pat. No. 3,803,960.

BACKGROUND OF THE INVENTION

The present invention relates to an automatically controlled cutting machine in which a cutting blade is advanced along a cutting path in accordance with programmed commands. More particularly, the present invention relates to a system in which pattern pieces are cut from sheet material by programming the cutting blade to advance along different contoured segments of a pattern piece in different directions about the pattern piece.

Numerically controlled cutting machines of the type disclosed in U.S. Pat. Nos. 3,347,121 to Wiatt and 3,495,492 to Gerber et al., are well known in the art and are used for cutting large numbers of pattern pieces from layups of sheet material. One primary advantage offered by the automatically controlled cutting machines is their ability to cut closely nested pattern pieces from the layups and to reduce waste and the cost of materials.

The closer nesting of patterns within a layup, however, is not without certain difficulties which arise due to the inherent characteristics of a cutting operation in which a rotating or reciprocating blade or equivalent mechanical cutting tool is moved in cutting contact with the sheet material. In particular, difficulties arise where one cutting path extends in close proximity to another. When the first cut is made along one of two adjacent cutting paths, there is no difficulty because it is not material to the cutting operation that an adjacent cut is contemplated. However, when the second cut is made adjacent the previous cut, the rigidity of the sheet material, which is necessary for an accurate cut, decreasees, generally with the distance between the cutting paths. Furthermore, where segments of adjacent cutting paths extend generally tangent to one another, that is, in either contacting or closely spaced relationship to each other, limp sheet material such as woven and non-woven fabrics used to manufacture apparel will shift or move away from a cutting blade and distort a properly programmed contour in the finished piece. Apparatus such as disclosed in U.S. Pat. No. 3,495,492, referenced above rigidizes limp sheet material to a degree. Nevertheless, it has been found that the difficulties of cutting along closely spaced or generally tangent cutting paths can be further reduced by controlling cutting parameters relating to the movement of the cutting blade through the material at the sensitive points, the points of tangency or close approach.

It is accordingly a general object of the present invention to disclose a system and method for cutting pattern pieces from limp sheet material at sensitive points by controlling selected cutting parameters in an automatically controlled cutting machine.

SUMMARY OF THE INVENTION

The present invention resides in a system and method for cutting pattern pieces from sheet material by means of a program controlled cutting machine. The principal features of the invention relate to the generation of a cutting program and the steps carried out by the cutting machine in response to the cutting program.

The invention in one form is related to a system from which the cutting program is generated by initially reducing the contours of the pattern pieces in a marker layup to point data form by a two-stage digitizing process. Each segment of the pattern contours is identified by point data and the cutting direction along the segment. The direction of cutting along a given contour, and the order of cutting the contours is defined by the order in which the point data is arranged or called for in the program. Such order is obtained by digitizing the contour segments in one direction and by rearranging the data after digitizing in a standardized order.

With the data arranged in the order necessary for the proper cutting direction about a given pattern piece, it is then processed in the system by conventional data processing techniques used in the past to generate cutting commands intelligible to the cutting machine. The processed data may then be recorded in a memory device, such as a punched or magnetic tape, or may be utilized directly by the cutting machine to execute a cutting operation.

The program generated by the above system permits a cutting tool to be advanced along a cutting path defined by the contours of a pattern piece in both the clockwise and counterclockwise directions. The program also permits certain contour segments to be cut before others. It is advantageous to cut in this manner since it allows the tool to approach sensitive points, such as a point of tangency or a point closest to the contour of an adjacent piece, from two directions and to alleviate difficulties by making certain cuts before others. The ability to cut in two directions or establish cut priorities is referred to as "cutting protocol." Cutting protocol eases the task of cutting closely nested pattern pieces in a marker layout.

A further factor in cutting protocol is the manner in which a cut is executed. Two special techniques comprise introducing into the cutting program reduced feedrate commands and directional bias commands at sensitive points. The bias commands cause a cutting blade to be rotated out of a tangent position at any point along the cutting path and away from an adjacent and previously made cut.

DESCRIPTION OF THE PREFERRED EMBODIMENTS

Figure 1:
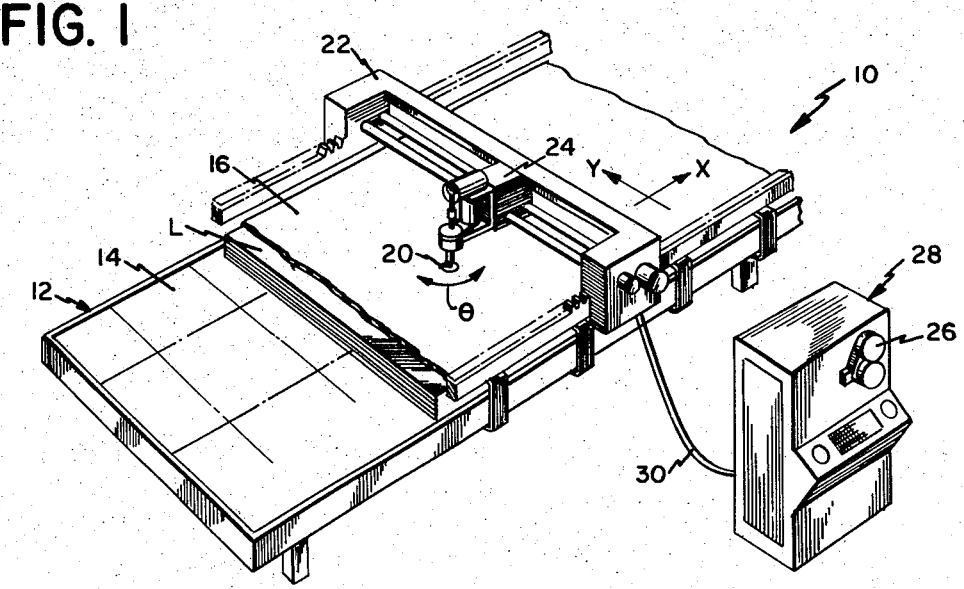
FIG. 1 is a perspective view of a cutting machine which can be utilized to cut a plurality of pattern pieces from layups of sheet material in accordance with the present invention.

FIG. 1 discloses an automatically controlled cutting machine 10 having a cutting table 12 which is utilized in the present invention for cutting a plurality of pattern pieces from sheet material spread on the table. The cutting machine has a multitude of uses but is now frequently found in the apparel and upholstering industries where a plurality of pattern pieces are cut from limp sheet material such as a woven or non-woven fabric. After a cutting operation, the cut pieces are removed from the table 12 and assembled in finished form as articles of clothing or upholstery.

In cutting machines of the type illustrated, the sheet material is spread in a multi-tier layup L on the support surface 14 of the table 12. The layup is held in position by, for example, an air impervious overlay 16 and a vacuum system incorporated in the bed of the table as described in greater detail in U.S. Pat. No. 3,495,492 referenced above.

A cutting tool such as a reciprocating knife blade 20 is translated over the layup in the illustrated X and Y coordinate directions by means of an X carriage 22 and a Y carriage 24, respectively, forming mechanized portions of the table 12. The tool 20 is also rotated in a controlled manner about a $\theta$ axis perpendicular to the X and Y axes and the support surface 14 so that the knife is oriented generally tangent to a cutting path at each point.

The movements of the cutting blade 20 through the layup L are programmed in a memory device such as the punched tape 26. Basic cutting commands on the tape are read by a controller 28 and converted by the controller into signals intelligible to the motor controls of the cutting table 12. The commands are transmitted to the cutting table through the cable 30 and regulate the blade motions relative to the X-, Y- and $\theta$-axes as well as the drive motors which lift and reciprocate the blade 20. Additional auxiliary commands may also be transmitted to the cutting table to control drilling, marking and other functions related to the cutting operation.

Figure 2:
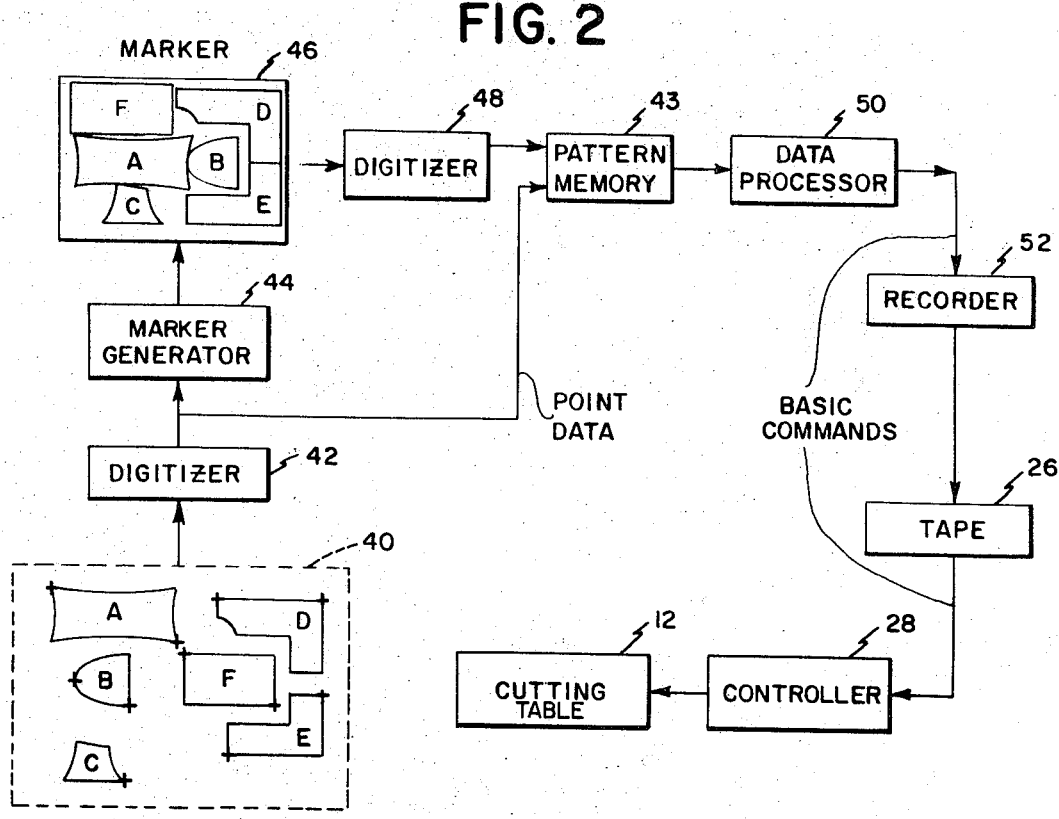
FIG. 2 is a block diagram of a complete cutting system including components for generating a cutting program and the machine in FIG. 1.

FIG. 2 shows the complete cutting system including the components which generate the program tapes 26 for cutting a a plurality of pattern pieces from sheet material on the table 12. It will be readily understood that once program tapes have been generated for markers, the grouped pattern pieces to be cut in the sheet material, it is only necessary to change the tape read by the controller 28 to change the marker patterns and the cutting operation. The controller 28 and cutting table 12 do not differ from the controllers and table known in the prior art. The entire system, however, which generates the program tapes defining the cutting operations, the method by which the tapes are generated in this system and the cutting methods disclosed are considered to be new and are described in greater detail below.

The primary information needed to generate a program tape is the configuration of the pattern pieces to be cut. Exemplary pattern pieces are illustrated in the plaque 40 of FIG. 2, each pattern piece being identified by a letter. The pattern pieces may represent portions of clothing or upholstering which are to be manufactured from fabric material cut on the table 12. The contours of the pattern pieces are initially reduced to point data by means of a coordinate digitizer 42. The digitizer 42 is conventional and is operated manually or automatically as described in U.S. Pat. No. 3,609,237 issued Sept. 28, 1971 to trace the contour of each pattern piece and produce signals representing the coordinates of spaced points along the contours. In the digitizing process, a reticle or other optical index is moved along the contour of each pattern piece in a given direction and, as the digitizing process progresses, thet data points for the individual pattern pieces are recorded sequentially in a buffer or pattern memory 43 at specified addresses. The data points at any given address are, therefore, listed in the same order in which the poins have been digitized. Sufficient data points are recorded to fully define the important contours of a pattern piece so that a cutting tool, commanded to move between the recorded points in the same order in which the points appear in the memory, tracks the contours of a given pattern piece in the same direction as digitized.

After the pattern pieces have been individually digitized, the point data is fed to a marker generator 44 which produces a marker layout 46. The marker layout defines the relative positioning of the pattern pieces with respect to one another and with respect to the perimeter of sheet material from which the pattern pieces are to be cut. Therefore, the marker layout, sometimes referred to simply as the marker, represents the relative placement of the pattern pieces in a closely nested arrangement to be cut from the sheet material. The marker generator 44 may be the type disclosed in U.S. Pat. No. 3,596,068 which optimizes material utilization. Computerized marker generators which automatically optimize material utilization include a packing subroutine which effectively shifts the pattern pieces within the boundaries of a marker until the amount of material required for the pieces to be cut is a minimum. The pattern pieces in the marker layout after the packing operation are closely nested and frequently have points of tangency or common contour segments between adjacent pieces. Although close nesting is desirable from the standpoint of material economies, the cutting operation can be made very difficult by that condition.

The generation of the marker layout 46 can also be performed manually without the generator 44. In this case, the output of digitizer 42 is merely stored for future use.

A third, semi-automatic method of generating the marker employs an interactive graphics process. In this process the pattern pieces are displayed on a tablet or cathode ray tube (CRT) connected to a data computer in which the contours of the individual pieces are stored. An index instrument such as an electrical wand or light pen interacting with the tablet or CRT is manipulated over the display to shift the pattern pieces into various positions and obtain close nesting by a trial-and-error process resembling the entirely manual process of making markers. When the final grouping is arrived at, the display is frozen.

Once a marker layout 46 is generated, the positioning of the individual pattern pieces within the boundaries of the marker and relative to one another is stored in the memory 43 by transmitting point data defining the marker directly to the memory from the generator 44 or by reducing the marker display to point data by the digitizer 48. Separate digitizers 42 and 48 are represented in FIG. 2 and the construction of the digitizers may be the same or different depending upon the digitizing processes selected. If the processes are both manual and performed at different times, the same digitizer may be used at each stage of the programming process.

The process in which, first, the pattern pieces are individually digitized and, second, the placement of the pattern pieces on the marker layout is digitized is referred to as a two-stage digitizing process. In the first stage, in addition to digitizing the full contour of each pattern piece, it is necessary to establish geometric reference points for each pattern piece such as those points indicated by crosses in the plaque 40. During the second stage of digitizing either the reference points of the individual pattern pieces are located relative to the periphery of the layout and stored in the memory 43, or data within the generator 44 identifying the positional relationship of the pieces in the layout is transmitted to the memory. It will be noted that with two stage digitizing, a given pattern piece is completely digitized only once even though the piece appears in the marker more than once.

With the position of each pattern piece located relative to the marker layout and each individual pattern piece digitized, the marker layout is completely defined in the memory 43 so that in subsequent operations of the data processor 50, all data points defining the pattern piece contours can be referenced to the marker layout.

The point data received from the memory 43 by the data processor 50 is effectively raw data defining only the contours to be cut from a layup of sheet material on the cutting table 12. Raw data cannot be fed directly to the cutting machine but must be converted into a form of basic machine commands intelligible to the cutting machine. For example, the basic commands must be correlated with the feedrate capacity of the cutting machine which is limited by the servo motors driving the carriage and the cutting blade. Other limitations of the cutting machine require that the cutting blade be lifted, rotated and then plunged through the layup to cut sharp corners during a cutting operation. Furthermore, in accordance with the present invention, the cutting blade is moved in a particular manner about a pattern piece in order to cut the desired contours most accurately with the least difficulty.

To this end the raw point data is operated upon by the data processor 50 to produce basic machine commands at the processor output. If the basic commands are not to be utilized immediately, recorder 52 makes a permanent record of the commands on the program tape 26. The tape 26 is merely a memory device which preserves the basic commands until they are read by the controller 28 during a cutting operation.

Figure 3:
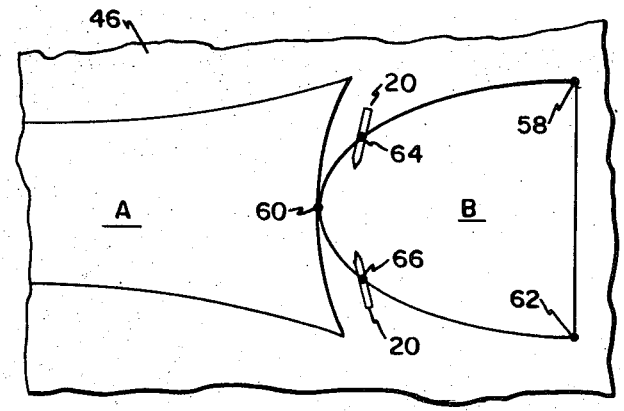
FIG. 3 is an enlarged plan view of one portion of a marker showing a method of cutting in accordance with the present invention.

Turning, then, more particularly to the present invention, reference is made to FIG. 3 which is an enlarged portion of the marker layout in the region including adjacent pattern pieces A and B. Due to the closely nested relationship of the pattern pieces, pieces A and B are tangent at a point 60 of closest approach. A point of tangency of the type illustrated poses a cutting problem with limp sheet material because the materials are incapable of rigidly supporting themselves in the region of the tangent contours after the first cut through point 60. The problem is present wherever adjacent contours are generally tangent, that is either precisely tangent at a single point of contact or merely in closely spaced but noncontacting relationship with one another.

For example, it will be assumed that piece A is cut before piece B. As the blade traverses the tangent contour of piece A at point 60, the blade is always moving into virgin material, that is, material which has not been cut and therefore is fully supported by adjacent material. If the cutting blade is subsequently called upon to pass through point 60 while following the curved contour of piece B, counterclockwise from point 58, the knife may be caused to deviate from a true cutting path toward the piece A as it approaches point 60 because the sliver of material between the blade and the previous cut along the contour of piece A is less firmly supported than the material within the contour of piece B and the forces in the material eventually cause the blade to "jump" into the previous cut. Furthermore, if the reciprocating cutting blade attempts to move counterclockwise about pattern piece B from point 60 toward point 62 after pattern piece A has been cut, the material within pattern piece B has a tendency to allow itself to be pushed toward the interior of pattern piece B by the blade as the cut is initiated.

Cutting pattern piece B in the clockwise rather than a counterclockwise direction does not alleviate the difficulty of cutting the contours in the vicinity of point 60 because the symmetric slivers at each side of point 60 present the same difficulties.

The preferred manner of cutting pattern piece B is to advance the cutting blade counterclockwise about the pattern from point 58 to point 60 and clockwise about the pattern piece from point 62 to point 60. Cutting the pattern in this manner eliminates the more difficult problem of initiating a cut at the apex of the sliver and allows resort to another solution for cutting toward point 60.

The problem of cutting toward a point of close approach, such as the point 60, can be minimized by two steps. First, the feedrate of the cutting blade 20 illustrated at point 64 along the contour may be reduced as it passes point 64 during movement toward point 60. Reducing the feedrate of a reciprocating blade driven at a substantially constant reciprocation rate allows a greater number of cutting strokes per unit length of contour and thereby reduces the tendency of the blade to jump into the previous cut along the adjacent contour of pattern piece A. Second, the orientation of the cutting blade about the θ-axis perpendicular to the sheet material is changed slightly by adding a θ-bias or yaw compensation which rotates the cutting blade slightly and urges the cutting edge of the blade inwardly of the curved contour of piece B and away from the adjacent and previously cut contour of pattern piece A. The combined steps of feedrate reduction or slowdown and yaw compensation allow the blade to move substantially along the contour of piece B until it reaches point 60. Similar steps are taken as the blade approaches point 60 from point 62. Slowdown is initiated at point 66 together with the slight rotation of the blade out of its tangent relationship as shown to turn the cutting blade inwardly of the curved contour of piece B and away from the adjacent contour of piece A. The amount of yaw compensation shown in FIG. 3 is greatly exaggerated merely to illustrate the concept. In reality, such compensation or the departure of the cutting blade from a precisely tangent relationship to the contour may fall within the range of 1°–10°. Furthermore, the amount of compensation may be fixed or increased in either a stepwise or continuous manner as the knife approaches point 60. The compensation does not have to be initiated simultaneously with nor even be accompanied by the feedrate slowdown. The preferred compensation and manner of introducing the compensation depends upon factors such as the material cutting characteristics, the desired accuracy of cut, cutting blade dimensions, the position of the $\theta$-axis relative to the cutting edge of the blade and others.

It will be noted that the cutting blades 20 illustrated at point 64 and 66 are rotated about the $\theta$-axes at points 64 and 66 respectively which axes are approximately midway between the leading and trailing edges of the blades. Positioning the axis in this manner minimizes the displacement of the sheet material due to blade rotation and minimizes the twisting moment carried through the blade about the $\theta$-axis. The minimization of the material displacement and twisting moment of a reciprocating blade is highly desirable. There is less tendency for the blade to break due to the small twisting moment. A twisting of the blade along the $\theta$-axis results in the blade orientation in the upper plies of the layup being slightly different from the orientation in the lower plies. With different orientations, the upper and lower portions of the blade will not track the same cutting path which results in different cutting paths being followed in the upper and lower plies of the layup and bending or possible breakage of the blade. Also, by rotating a reciprocating cutting blade about an axis midway between the leading and trailing edges, there is less tendency to produce nonintersecting cuts from consecutive strokes along a curved cutting path.

Figure 4:
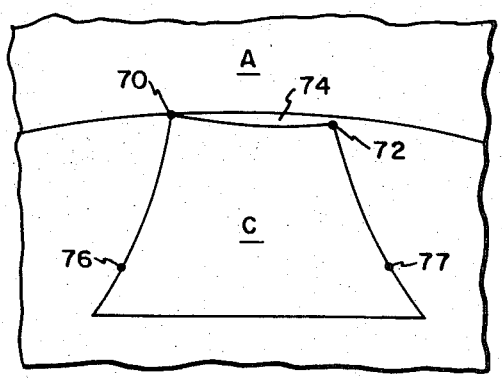
FIG. 4 is an enlarged plan view of another portion of a marker cut in accordance with the present invention.

Another difficult cutting situation is illustrated in FIG. 4 where parts A and C are shown in closely nested and contacting relationship. The difficulty arises because of the intersection of the contours at point 70 and the closeness of the pieces at point 72. If pattern piece A has been cut before pattern piece C, and if pattern piece C is cut entirely in one direction, that is either clockwise or counterclockwise about the pattern piece, the cutting blade will be required to plunge through the layup and cut away from a point between or the apex of two intersecting cuts. Depending upon the acuteness of the angle between the cuts and their proximity, many materials do not permit a cut to be initiated at such points. Furthermore, due to the relatively thin sliver 74 of material between pieces A and C, cutting the contour of pattern piece C between points 70 and 72 may be difficult. The preferred method for cutting the contours shown in FIG. 4 is to omit cutting the adjacent contour of pattern piece A until after the contours of pattern piece C have been cut. Once pattern piece C has been cut, it is frequently possible to cut the adjacent contour of pattern piece A without difficulty.

Sometimes known difficulties cannot be eliminated by the above described techniques in which case the order of cutting the contour segments is then made to depend upon the importance of the contours being cut. For example, shoulder cuts for the front panels of suits or shirts are more important than cuts for the bottom hem of trousers or shirts. A hem cut is hidden far below the external edge of a trouser leg whereas the shoulder cut must be fairly accurate in order to minimize the amount of material at the shoulder seam. If, for example, the contour of piece A in FIG. 4 represents a shoulder cut while the adjacent contour of piece C between points 70 and 72 is a hem cut, it may be essential, contrary to the preferred technique mentioned above, that the contour of part A be cut first. The segment of piece C adjacent to the sliver 74 is then cut from the midpoint to point 70 and from the midpoint to 72. Slowdown or yaw compensation or both may be required as the blade approaches points 70 and 72 because of the close proximity of the adjacent, previously cut contour of pattern piece A. Lastly, the lateral sides of pattern piece C are cut from point 76 to point 70 and point 77 to 72. The direction, order and manner of cutting in accordance with the geometric relationship of the contours, the accuracy of the cuts and other factors are all part of cutting protocol.

Figure 5:
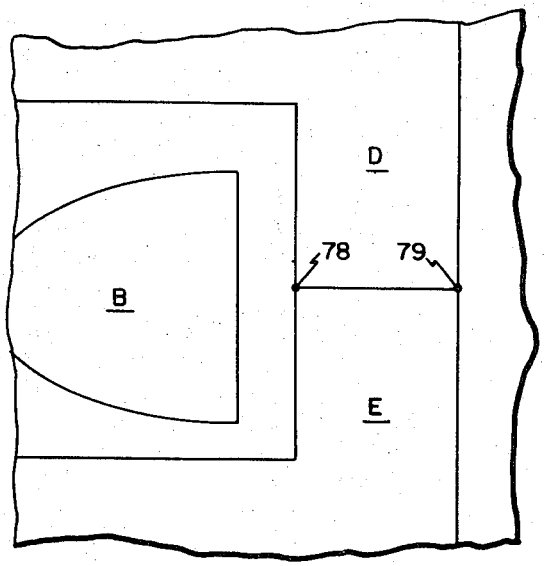
FIG. 5 is an enlarged plan view of still another portion of marker cut in accordance with the present invention.

Another special cutting situation requiring cutting protocol is illustrated in FIG. 5 where pattern pieces D and E are contiguous between points 78 and 79. Obviously if pattern piece D is cut before pattern piece E, the segment between points 78 and 79 need not be traversed again by a cutting blade during the cutting of piece E. In addition to save time during the cutting operation and to avoid fraying of the fabric material along the previously cut segment, the segment is omitted entirely from the cutting program for pattern piece E.

Alternatively, it may be desirable to cut the combined profile of pattern pieces D and E in its entirety and then cut the common contours of the pattern pieces with a single pass between points 78 and 79.

In each of the cutting situations described above with respect to FIGS. 3–5, the order of cuts and the direction of cut along a given contour segment require that the cutting blade be moved selectively about a pattern piece and in two directions, that is clockwise and counterclockwise. If a cutting tool were caused to cut around a given pattern piece continuously and in the same direction as the piece was originally digitized on plaque 40, the difficulties mentioned above could be avoided only by allowing greater spacing between adjacent pattern pieces along with the attendant increase in waste material. Cutting around a pattern piece in a single direction would come about in the two-stage digitizing process simply because it is inherent in programming that a pattern piece, without additional information, be cut in the same direction that it is digitized. It is, therefore, necessary to develop data processing techniques which permit a single pattern piece to be cut in different cutting directions about the pattern piece and to select portions of the cutting contour to be omitted altogether from the program on the tape 26 or to be placed at different positions in the program.

The process by which the cutting program is generated with cutting protocol is described below in conjunction with the apparatus shown in FIGS. 2 and 6. It will be assumed that a marker layout display has been made either manually or by the generator 44 as described above. The person operating the digitizer 48 examines the marker layout to determine those cutting situations which would pose a problem requiring special techniques. The person then identifies in the digitized data of a given pattern piece in the memory 43 those segments which require cutting in a direction opposite that in which the segments were digitized or those segments which are omitted or those segments to be cut at a later time. The identification can be made by scanning the memory for the identified pattern piece at the previously established address or addresses and then locating the end points of the contour segment to be cut in a special manner by placing the reticle of the digitizer on the end points of the segments as displayed on the marker layout. "Blade down" and "blade up" commands are given with the identification of the first and last data points respectively of each segment. Alternately, the end points may be designated as "from" points and "to" points, referring to the directions in which the blade is to move relative to the points. The data processor 50 is then commanded to rearrange the point data defining the identified segments before further operating upon the point data to produce a program tape.

It should be noted that in systems where the marker layout has been generated semi-automatically or automatically, the marker layout can be unambiguously defined by data transmitted directly to the pattern memory 43 from the generator 44. However, certain ambiguities may exist in the stored information defining the marker layout when the digitizer 48 is used because of the limited accuracy of the two digitizing steps, the first with digitizer 42 and the second with digitizer 48. An additional ambiguity can be introduced when the person operating the digitizer 48 attempts to locate on the marker layout the end points of the specially cut segments, again because of the limited accuracy of the digitizing step which may result in noncoincidence of the digitized and previously stored data points. It is preferable to pre-process the digitized and recorded data by vexing resolving techniques to remove such ambiguities before the programming routine is entered in the data processor 50.

Figure 6:
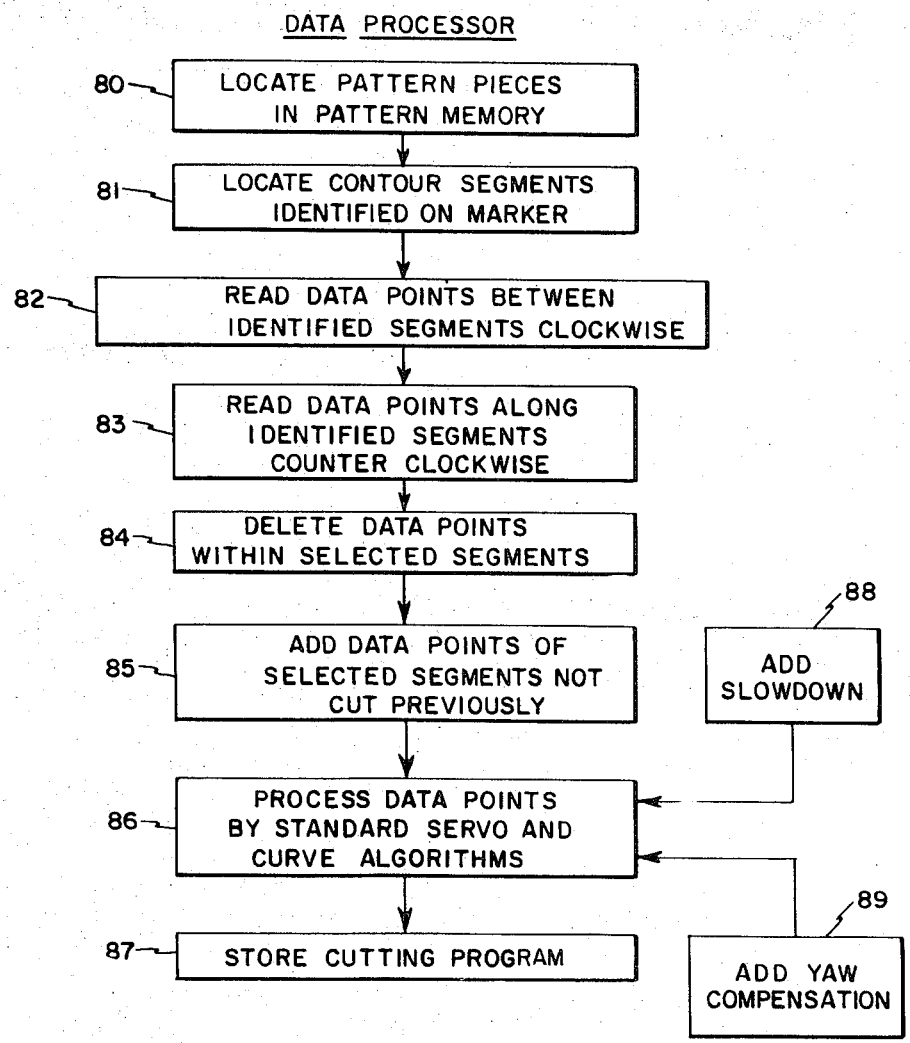
FIG. 6 is a flow chart depicting the operations of the data processor in FIG. 2.

FIG. 6 illustrates generally the functions performed by the data processor in reaarranging the data while a program is generated. It should be understood that the complete operation of the data processor includes introducing other conventional instructions such as knife lifting and plunging commands, feedrate commands and commands relating to notching and drilling functions. Data processors performing conventional programming of tapes are old in the art and hence the complete programming operation performed by the data processor is not shown or described with respect to FIG. 6. Only that portion relating to the cutting protocol techniques is presented.

Assuming that the information by the the contour of each pattern piece and the location of each pattern piece in the marker layout has been stored in the pattern memory 43, the processor 50 as indicated in the flow chart of FIG. 6 at 80 and 81 locates in the memory the pattern pieces and the identified contour segments in accordance with the special cutting instructions received from the person operating the digitizer 48. Assuming also for the purposes of discussion that each pattern piece has been digitized in a clockwise routine the data processor 50 then reads from the memory as shown at 82 the data points of segments between the identified segments in the clockwise direction, that is, the order in which the data points are stored in the memory. Such data points are associated with the segments to be cut in the same direction in which they were digitized. As shown at 83, the processor then reads the data points along the identified segments in the counterclockwise direction, that is, the opposite direction in which the points are entered in the pattern memory. The newly arranged data points are then stored temporarily.

The next operation performed by the processor at 84 is to delete data points associated with selected segments which are not to be cut in their normal turn or which are not to be cut at all simply because they overlap or share a common contour with an adjacent pattern piece. Then the data points of other selected segments not previously cut are added to the program at 85. The order in which the two reading, the deleting and the adding steps are performed may be varied depending upon the cutting routing desired.

Once the data points have been rearranged in accordance with the direction and order in which the contour segments are to be cut, the data is then processed at 86 by standard servo and curve algorithms utilized in the past to process point data and produce a cutting program with basic commands that are understood by the controller 28 and machine 12. The program is then stored permanently at 87 on a program tape 26 by the recorder 52 in FIG. 2.

During the processing of the rearranged data, feedrate slowdown at 88 and yaw compensation at 89 may be added by appropriate programming subroutines within the data processor 50.

Figures 7, 8:
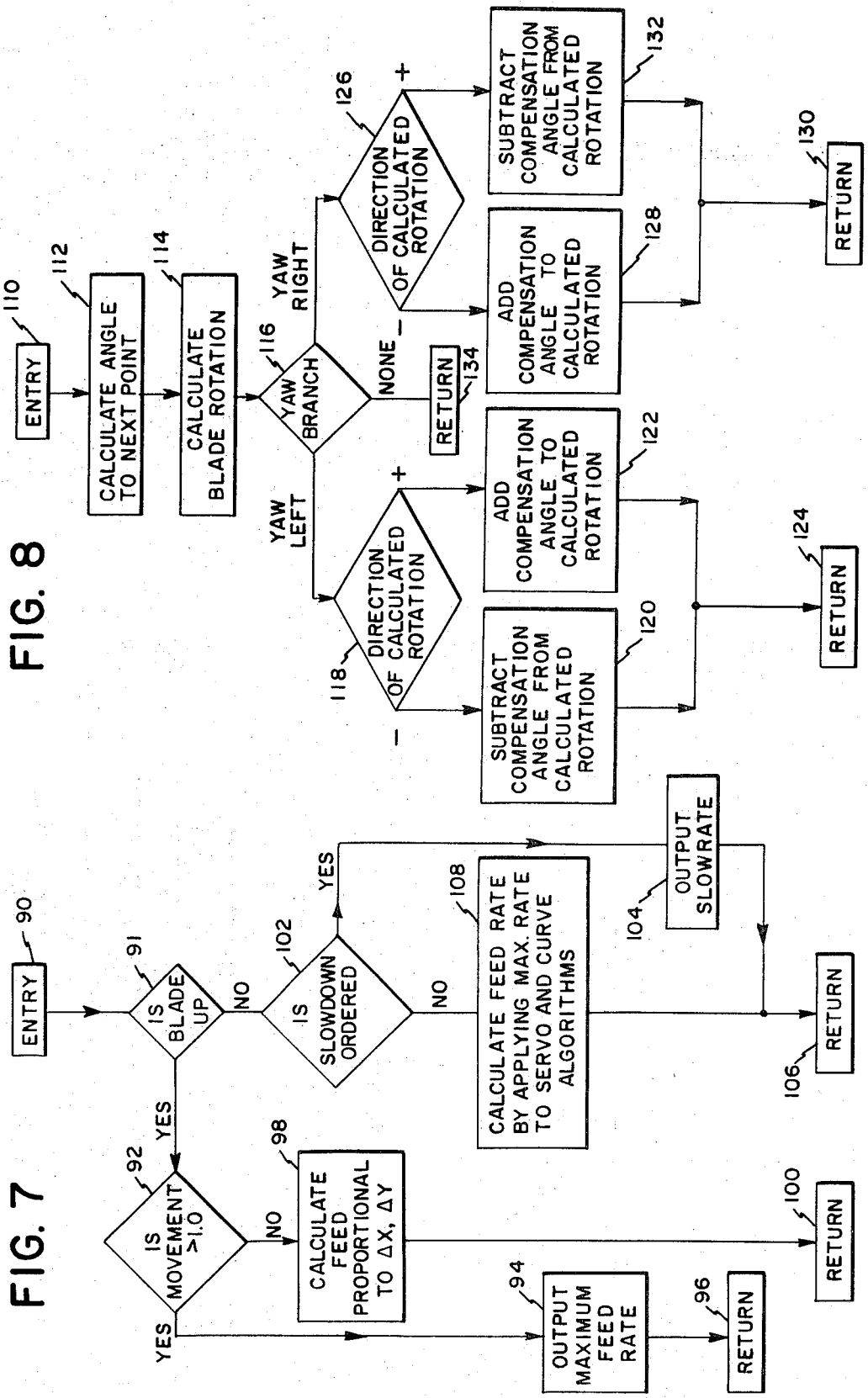
FIG. 7 is a flow diagram of the feedrate subroutine utilized by the data processor in FIG. 2.
FIG. 8 is a flow diagram of the blade angle subroutine utilized by the data processor in FIG. 2.

FIG. 7 is a flow diagram representing the information paths in the feedrate subroutine. The subroutine is entered each time a new data point is examined. At the data points, such as points 64 and 66 in FIG. 3, an accompanying slowdown command will have been ordered by the person identifying the segments cut in a special manner.

Following entry into the feedrate subroutine at 90 as shown in FIG. 7, the first matter considered at 91 is whether the cutting blade is up or down. If the blade is up, the rate of advancement of the table carriages is not governed by the cutting difficulties, but is instead controlled by the length of the movement to the next cutting point. As indicated at point 92 if the movement is greater than a given amount, for example 1.0 inch, the subroutine at 94 outputs a maximum feedrate in the program and then returns at 96 to process the next data point. If the movement is not greater than a given amount, then the feedrate is calculated to be a portion of the maximum rate having the same ratio with the maximum rate as the commanded displacement does with the unit of movement which is the basis for the decision at 92. The feedrate subroutine then returns at 100 to the next data point.

If the decision at 91 is negative because the cutting blade is down and therefore engaged with the sheet material being cut, the next decision made at 102 is whether the slowdown has been ordered at the data point under consideration. If the answer is affirmative, a reduced feedrate is taken from a parameter card inserted in the processor 50 and is recorded in the program as indicated at 104. The subroutine is departed at 106 to process the next data point. If slowdown has not been ordered at 102, then the standard feedrate is calculated by applying the maximum rate to the servo and curve algorithms as in the prior art. In such a case the data processor returns at 106 to processing the next data point and the program will cause the cutting blade to track a contoured segment without modifying the feedrate.

It will be understood that the feedrate subroutine is entered during the processing of each data point. However, the decision made at 102 once set remains fixed until the data pont at the end of a curve requiring slowdown is reached together with an accompanying reset command. The individual operating the digitizer will have previously recorded the resetting command with that particular data point. Normal feedrate commands are generated thereafter.

FIG. 8 discloses the subroutine within the data processor which controls the θ-angle of the cutting blade at each data point. This subroutine during conventional processing of the point data calculates the incremental rotation required to maintain the cutting blade tangent to a curved cutting path at each point. The subroutine is modified as illustrated to permit the introduction of yaw compensation to turn the blade to one side or the other of the cutting path and away from an adjacent and previously cut contour segment.

The subroutine is entered at 110 and the first function performed at 112 is calculating the angle of the cutting path to the next data point on the cutting path. The next step at 114 is calculating the incremental rotation of the blade about the θ-axis to maintain the blade in its generally tangent relationship to the cutting path. The incremental rotation including the direction of rottation, that is for example, positive for incremental rotations in thte counterclockwise direction and negative for incremental rotations in the clockwise direction, are applied to the yaw branch 116. The yaw branch is set by the the individual introducing the yaw commands from the digitizer 48 in FIG. 2 at selected points along the cutting contours, such as points 64 and 66 in FIG. 3. The yaw branch, once set by the individual remains set until the yaw command is either removed or changed.

Assuming that a yaw left command illustrated at point 64 in FIG. 3 has been imposed on the yaw branch 116, the left branch in FIG. 8 is followed to 118. It is then necessary to determine what the direction of the rotation calculated at 114 was. If the rotation is negative so that the blade is rotated clockwise or to the right of the cutting path and a yaw left compensation has been ordered, it is necessary to subtract the compensation angle from the calculated rotation as indicated at 120. The data processing is then returned at 124 to the calculations for the next data point. If the direction of rotation is positive or counterclockwise, it is necessary to add the yaw left command to the calculated rotation as indicated at 122.

If yaw right illustrated in FIG. 3 at point 66 has been ordered at the branch 116, the right branch is followed to 126. If the rotation is negative or clockwise, yaw compensation is added to the calculated rotation at 128 and the subroutine returns to the next data point at 130. If the rotation is positive or counterclockwise, the yaw compensation must be subtracted from the calculated rotation as indicated at 132.

If no yaw command has been ordered at the branch 116 or after the yaw command has been removed, the calculated increment of rotation is recorded in the program and the subroutine returns at 134.

It will thus be seen that the cutting program generated by the data processor described above does not follow the contour segments in the same order in which the segments were digitized. Selected cutting sequences and directions of cut are established to carry out the cutting operation with the least difficulty and the greatest accuracy. In contrast to the programs employed in the past, it is possible to cut closely spaced and contiguous pattern pieces more successfully.

While the present invention has been described in several different embodiments, it should be understood that further modifications and substitutions can be had without departing from the spirit of the invention. For example, the specific cutting situations illustrated in FIGS. 3, 4 and 5 are merely exemplary of the difficulties encountered when pattern pieces are closely nested in a marker layout. The geometric figures represented may, of course, be varied but the same general problems associated with points of closest approach may still be encountered. It should also be understood that the severity of problems associated with points of closest approach or contiguous contours will vary in accordance with other factors such as the type of material being cut and its cutting characteristics, the type of cutting tool being utilized and the cutting characteristics of the tool including its sharpness, rate of reciprocation or other movement relative to the sheet material and dimensions. The described cutting techniques may be used singly or in combination. For example, it is possible to utilize slowdown without yawing or to change the direction of cut about the pattern piece segments without slowdown and yawing. Accordingly, the present invention has been described in several preferred forms merely by way of illustration rather than limitation.

We claim:

1. A method of cutting closely spaced pattern pieces from sheet material comprising the steps of: advancing a cutting tool in cutting engagement with the sheet material along one portion of a pattern piece contour in a given direction about the pattern piece until the cutting tool reaches a point closest to a previously cut contour of an adjacent piece; advancing the cutting tool in cutting engagement with the sheet material along another portion of the pattern piece contour toward said point in the opposite direction about the pattern piece until the cutting tool reaches said point; and reducing the rate of advancement of the cutting tool as the tool approaches said point in at least one of said directions.

2. The method of cutting in accordance with claim 1 including the additional step of removing the cutting tool from cutting engagement with the sheet material after the tool reaches said point in the given direction; then translating the cutting tool out of contact with the sheet material to the other portion of the contour; and reengaging the cutting tool in cutting engagement with the sheet material at the other portion before advancing the tool in the opposite direction.

3. The method of cutting in accordance with claim 1 wherein the steps of advancing comprise advancing a cutting blade along the contour in substantially perpendicular relationship to the sheet material and additional steps include rotating the cutting blade about an axis perpendicular to the sheet material to maintain the blade generally tangent to the contour and biasing the rotation of the blade as the blade approaches said point closest the contour of the adjacent piece to rotate the blade slightly away from the adjacent piece.

4. A method of cutting spaced pattern pieces in sheet material comprising the steps of: advancing a cutting tool and the sheet material relative to one another to cause the leading edge of the cutting tool to follow a cutting path defined by the contour of a pattern piece; and reducing the feed rate of the tool and the material relative to one another along all segments of the cutting path passing in close proximity to adjacent, previously cut contours and in a predefined manner unrelated to the cutting path geometry by itself.

5. A method of cutting closely spaced pattern pieces as defined in claim 4 wherein the step of advancing comprises advancing a cutting tool in the form of a cutting blade having a leading cutting edge along the cutting path; and additional steps include maintaining the cutting blade generally tangent to the cutting path at each point, and turning the blade slightly away from tangency along the segments of the cutting path adjacent previously cut contours to urge the leading edge of the blade away from the previously cut contour.

* * * * *